United States Patent [19]

Gertz

[11] Patent Number: 4,674,911
[45] Date of Patent: Jun. 23, 1987

[54] ENERGY ABSORBING PNEUMATIC CRASH CUSHION

[75] Inventor: David C. Gertz, Citrus Heights, Calif.

[73] Assignee: Energy Absorption Systems, Inc., Chicago, Ill.

[21] Appl. No.: 799,425

[22] Filed: Nov. 19, 1985

Related U.S. Application Data

[63] Continuation-in-part of Ser. No. 620,066, Jun. 13, 1984, abandoned.

[51] Int. Cl.$^4$ ............................................. E01F 15/00
[52] U.S. Cl. ..................................... 404/6; 256/13.1; 267/116; 267/122; 293/110
[58] Field of Search .................... 404/6; 267/116, 122, 267/139; 188/298, 377; 256/13.1; 293/107, 110, 132, 134, 135; 114/219; 104/254; 49/9

[56] References Cited

U.S. PATENT DOCUMENTS

| | | | |
|---|---|---|---|
| 2,773,686 | 12/1956 | Nash . | |
| 2,878,012 | 3/1959 | Crites | 267/122 |
| 3,254,883 | 6/1966 | Morgan . | |
| 3,741,598 | 6/1973 | Novak et al. | 267/116 X |
| 3,747,968 | 7/1973 | Hornsby | 293/110 |
| 3,759,351 | 9/1973 | Purple | 188/1 C |
| 3,871,636 | 3/1975 | Boyle | 293/107 X |
| 3,944,187 | 3/1976 | Walker | 256/13.1 |
| 3,971,583 | 7/1976 | Kornhauser | 293/110 |
| 3,982,734 | 9/1976 | Walker | 256/13.1 |
| 4,050,689 | 9/1977 | Barton et al. | 293/110 |
| 4,101,115 | 7/1978 | Meinzer | 256/13.1 |
| 4,105,236 | 8/1978 | Haar | 293/110 |
| 4,352,484 | 10/1982 | Gertz et al. | 256/13.1 |
| 4,366,885 | 1/1983 | Vrijburg | 188/377 |
| 4,399,980 | 8/1983 | Van Schie | 256/13.1 |

FOREIGN PATENT DOCUMENTS

| | | |
|---|---|---|
| 2426938 | 12/1975 | Fed. Rep. of Germany ...... 267/139 |
| 2927087 | 1/1981 | Fed. Rep. of Germany . |
| 1572542 | 6/1969 | France . |
| 2217598 | 2/1973 | France . |
| 451231 | 5/1968 | Switzerland ............................ 404/6 |

Primary Examiner—Stephen J. Novosad
Assistant Examiner—Matthew Smith
Attorney, Agent, or Firm—Willian Brinks Olds Hofer Gilson & Lione Ltd.

[57] ABSTRACT

A reusable energy absorbing apparatus comprising a plurality of air chambers and valve members. The air chambers and valves are constructed so that the valve members close upon the application of an axial force, thereby sealing air within the air chambers. After the energy absorbing apparatus has reached the end of its compressive stroke, the valve members release sequentially, thereby venting the pressurized air in the air chambers to minimize rebound.

33 Claims, 10 Drawing Figures

4,674,911

ENERGY ABSORBING PNEUMATIC CRASH CUSHION

CROSS REFERENCE TO RELATED APPLICATION

This application is a continuation-in-part of copending U.S. patent application Ser. No. 06/620,066, filed June 13, 1984 now abandoned.

BACKGROUND OF THE INVENTION

This invention relates to energy absorbing apparatus for preventing a vehicle from impacting a stationary structure. More particularly, this invention relates to a reusable impact attenuation device designed to absorb and dissipate the impact energy of a colliding vehicle or the like.

It is known to position energy absorbing devices along highways and the like to prevent vehicles from impacting stationary structures such as bridge abutments, parapets, signs, traffic dividers and rigid guardrails. Many of these devices suffer one or more of the following disadvantages: they are not reusable; they are difficult to repair or restore; they rebound the impacting vehicle back onto the highway where it may collide with other moving vehicles; they are expensive; they are not readily able to absorb the impact energy of a head on impact; and they occupy an inordinate amount of space.

Reusable energy absorbing devices have been developed. Some of these reusable energy absorbing devices suffer from the drawback of requiring either (1) that the energy absorbing material must be replenished within the barrier after an impact, or (2) that the portion of the apparatus which has been crushed by the impact must be replaced or repaired. Some of these reusable energy absorbing devices also suffer from the drawback that they require an inordinate amount of space and are difficult and expensive to restore to a useful condition.

One of the major problems in constructing any energy absorbing device is the problem of rebounding. When a compressible material reaches the end of its compressive stroke the material tends to rebound. This rebound can throw an impacting vehicle back into traffic, and it can injure the occupants of the impacting vehicle.

Thus, there is a need for a reusable impact attenuation device which has little rebound, is easily restored after an impact, and does not require an inordinate amount of space.

SUMMARY OF THE INVENTION

The present invention is directed to an energy absorbing apparatus for preventing a vehicle from impacting an object, comprising at least one air chamber for partially compressing upon the application of an impact force. The air chamber includes a valve for substantially sealing the air chamber upon the application of the force, so that air is compressed within the air chamber, and for releasing a portion of the air within the air chamber after the apparatus has reached the end of its compressive stroke to reduce rebound.

Preferably, the apparatus includes a plurality of air chambers which include valves which seal and vent sequentially. In a presently preferred embodiment, three or more air chambers are utilized, and the valve in the air chamber farthest from the object is the first to seal or vent.

The present invention provides an energy absorbing apparatus which includes at lease one air chamber which is compressed upon the application of an axial impact force and vents air after the end of the compressive stroke, thereby achieving the important advantage of minimal rebound. A further advantage of the present invention is that little manpower and time are required to restore the energy absorbing apparatus after an accident.

The preferred embodiments described below do not require an inordinate amount of space. These embodiments utilize a valve which seals air within an air chamber upon the application of a sufficient axial force and vents air from the air chamber after the air chamber has ended its compressive stroke. In this way, an impacting automobile is not thrown back into traffic. These embodiments include a plurality of valves which are actuated sequentially, and the walls are pleated and adapted to withstand a sufficient internal pressure so that the apparatus can stop a heavy car traveling at highway speeds.

Additional features and advantages are described in, and will be apparent from, the detailed description of the preferred embodiments and from the drawings.

DETAILED DESCRIPTION OF THE PRESENTLY PREFERRED EMBODIMENTS

Figure 1:
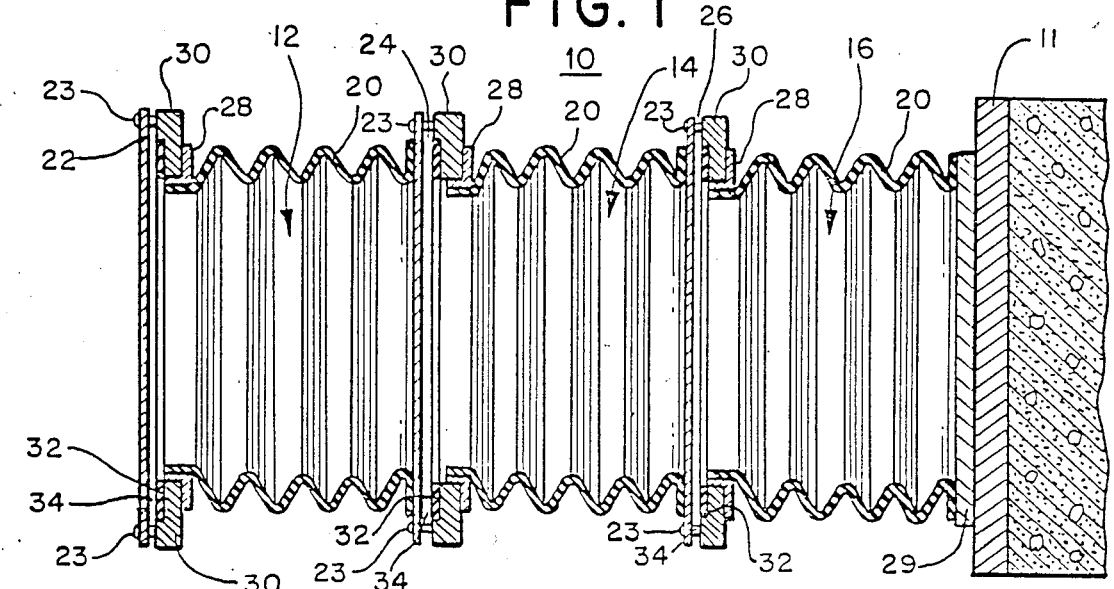
FIG. 1 is a longitudinal cross-sectional view of a presently preferred embodiment of the pneumatic crash cushion of the present invention.

Referring now to the drawings, FIG. 1 illustrates a first preferred embodiment of the energy absorbing pneumatic crash cushion 10 of the present invention. The pneumatic crash cushion 10 is designed and adapted to attenuate and dissipate the energy of an impacting vehicle, thereby preventing the vehicle from colliding with a stationary object 11. Moreover, the pneumatic crash cushion 10 is constructed so that there is little rebound at the end of the cushion's compressive stroke.

The energy absorbing pneumatic crash cushion 10 includes a first air chamber 12, a second air chamber 14, and a third air chamber 16. Of course, although only three air chambers 12, 14, and 16 are illustrated in the drawings, the pneumatic crash cushion 10 may include a greater or lesser number of air chambers.

The air chambers 12, 14, and 16 are cylindrical in shape and include pleated walls 20. The pleated walls 20 allow the air chambers 12, 14, and 16 to compress at least partially upon the application of a sufficient axial force.

The air chambers 12, 14, and 16 also include valves 22, 24, and 26 respectively. As will be described in greater detail below, the valves 22, 24, and 26 function to seal air within the air chambers 12, 14, and 16 upon the application of an axial force and to release air from the air chambers at the end of the compressive stroke of the pneumatic crash cushion 10.

Figure 5:
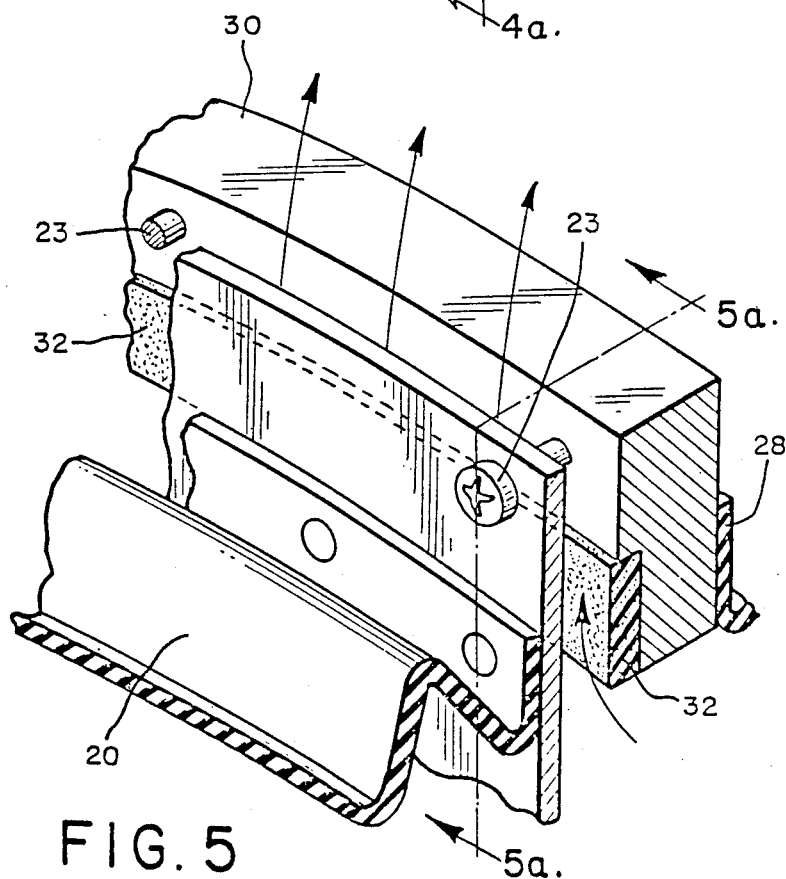
FIG. 5 is an enlarged fragmentary perspective view corresponding to FIG. 4 showing part of one of the seals of the embodiment of FIG. 1 in the open position of FIGS. 1 and 3.
Figure 5A:
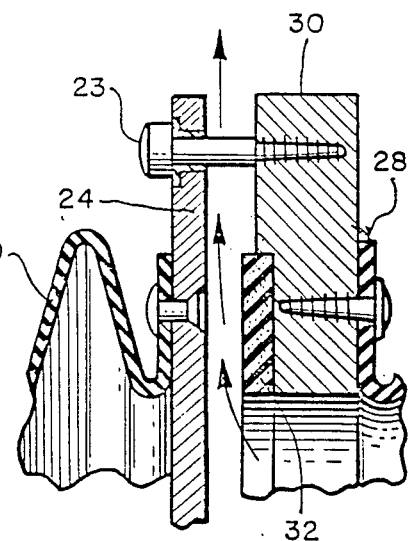
FIG. 5a is a fragmentary cross-sectional view taken along line 5a—5a of FIG. 5.

Each of the air chambers 12, 14, and 16 includes a diaphragm attachment ring 28, which is secured to an inertial diaphragm 30, and a valve seat 32. The inertial diaphragm 30 is secured to the attachment ring 28 by screws or some other means. The valves 22, 24, and 26 are attached to the valve seat 32 by shoulder bolts 23 or the like. The shoulder bolts 23 allow the valves 22, 24, and 26 to move axially, thereby creating an annular valve port 34. In order to vent the air chambers 12, 14, and 16 the valves 22, 24, and 26 must move axially only ¾ of an inch in this embodiment. As illustrated in FIG. 1, when the valves 22, 24, and 26 are open, the valve ports 34 are located between the valves 22, 24, and 26 and the respective valve seats 32. The valve ports 34 allow the air chambers 12, 14, and 16 to be in fluid communication with the surrounding atmosphere. FIGS. 5 and 5a provide more detailed views of a part of one of the valves 24 in the open, vented position.

Figure 2:
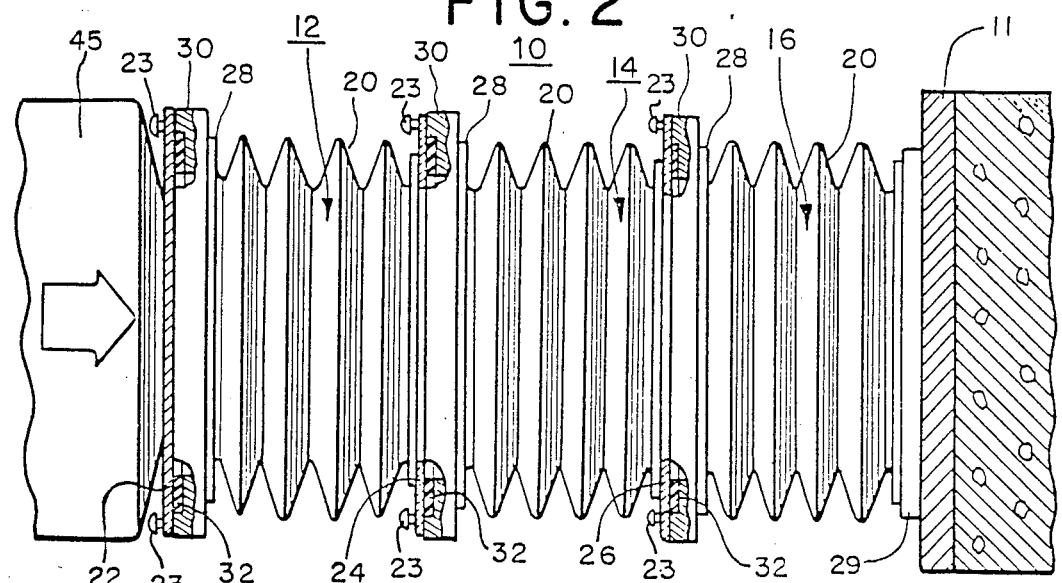
FIG. 2 is a top elevational view with parts broken away of the pneumatic crash cushion of FIG. 1 as it is being impacted by a mass.
Figure 4:
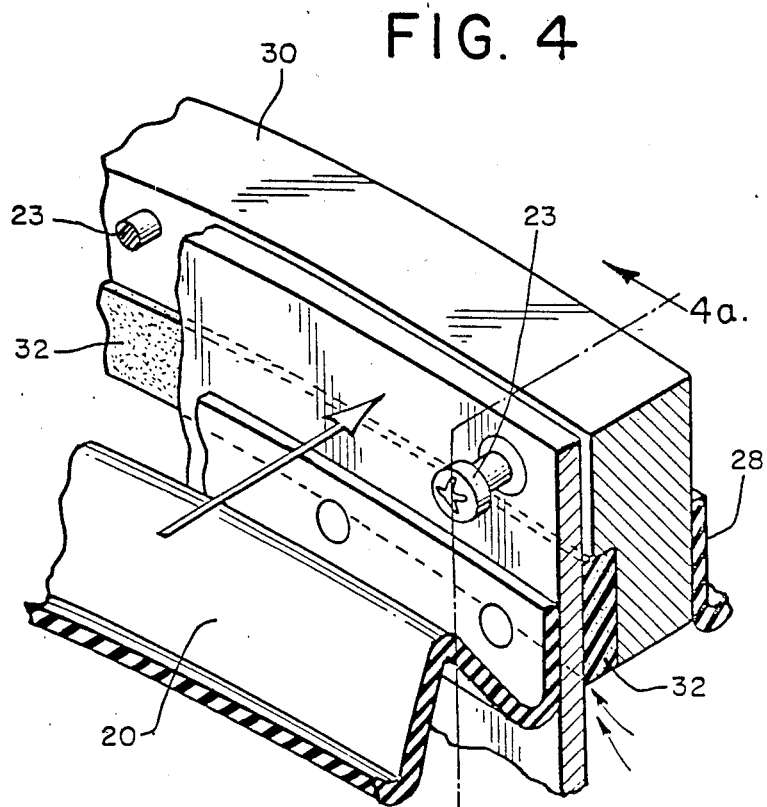
FIG. 4 is an enlarged fragmentary perspective view of part of one of the seals of the embodiment of FIG. 1 in the closed position of FIG. 2.
Figure 4A:
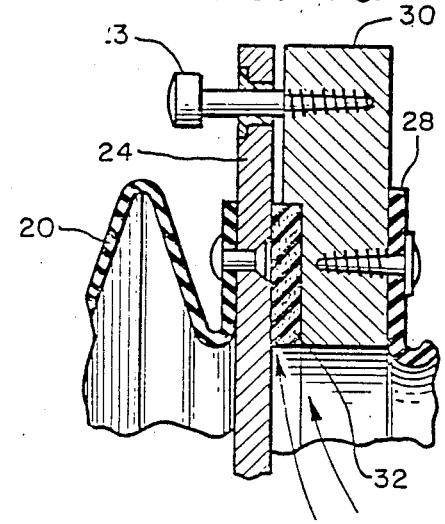
FIG. 4a is a fragmentary cross-sectional view taken along line 4a—4a of FIG. 4.

FIG. 2 illustrates the pneumatic crash cushion 10 in a compressed state, i.e. after the application of an axial impact force which is caused by the deceleration of a mass 45. As illustrated, upon the application of the axial impact force the valves 22, 24, and 26 of the respective air chambers 12, 14, and 16 close and seal the valve ports 34. FIGS. 4 and 4a provide more detailed views of part of one of the valves 24 in the closed, sealed position. Once the valves 22, 24, and 26 are so sealed, the pneumatic crash cushion 10, and thereby the air sealed therewithin, begins to compress. The compression of the crash cushion 10, and the air trapped therein, absorbs and dissipates some of the energy of the impacting force of the mass 45. The air trapped within the air chambers 12, 14, and 16 is used as a compressive member to bring the impacting mass 45 to rest.

At the instant that the pneumatic crash cushion 10 is at the end of its compressive stroke, the internal air pressure of the pneumatic crash cushion 10 reaches its highest pressure level. The internal air pressure within the pneumatic crash cushion 10 is nearly uniform in pressure at this time and exerts a constant force per area on the pleated side walls 20 and on the first valve 22. The valves 24 and 26 do not receive a net axial force nor do the valve seats 32 receive any axial force as a result of the internal air pressure of the crash cushion 10.

Figure 3:
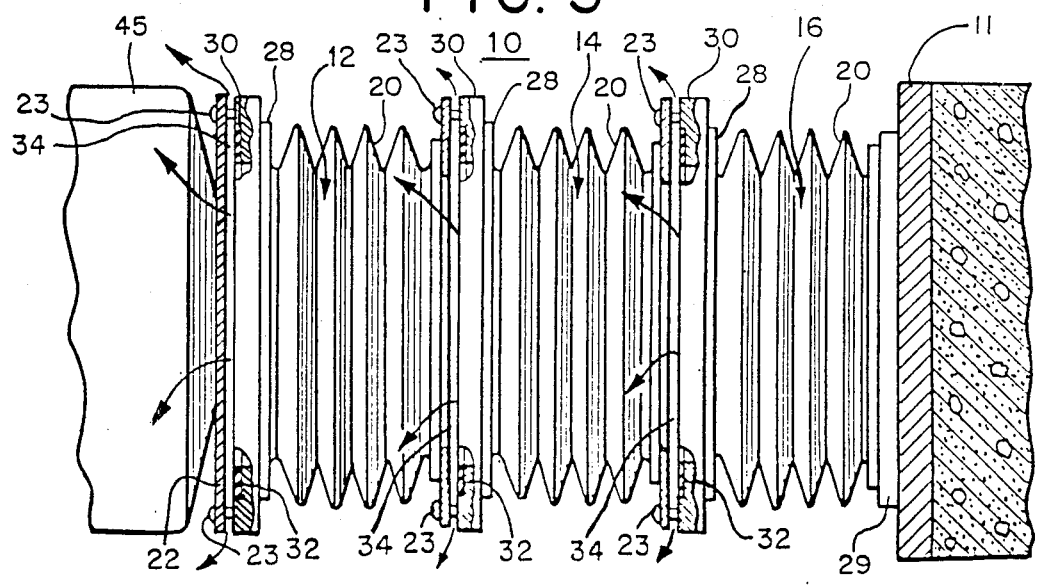
FIG. 3 is a top elevational view with parts broken away of the pneumatic crash cushion of FIG. 1 as it begins to rebound after being impacted by a mass.

As the pneumatic crash cushion 10 starts to rebound, as shown in FIG. 3, the first valve 22 is accelerated away from the stationary object 11. The valve seats 32 and inertial diaphragms 30 do not move away from the stationary object 11 as quickly because the air pressure does not impose a net axial force on them.

At the instant the first valve 22 rebounds and moves relative to the stationary object 11, the corresponding valve port 34 is opened and the air pressure in the first air chamber 12 is quickly reduced to the ambient pressure, due to venting. When the air pressure in the first air chamber 12 is reduced, the second valve 24 receives a net axial force due to the pressure difference between the first air chamber 12 and second air chamber 14. The net axial force on the second valve 24 causes the second valve 24 to move away from the stationary object 11, thereby opening the valve port 34 in the second air chamber 14.

When the second valve 24 moves it does not cause the valve seat 32 in the first air chamber 12 to move because the pleated wall 20 is easily collapsed and can not exert a high axial force on the inertial diaphragm 30. The mass of the inertial diaphragm 30 is sufficiently high that any axial force developed by the pleated wall 20 will cause little acceleration and movement of the inertial diaphragm 30. The valve port 34 in the first air chamber 12 will, therefore, remain open as the second and third valves 24 and 26 open sequentially. Once the valves 22, 24, and 26 are opened the internal air pressure of the pneumatic crash cushion 10 reaches ambient pressure quickly. Accordingly, the total rebound of mass 45 is exceedingly small.

Of course, if a fourth and fifth air chamber and valve are present, these will also vent sequentially in the manner described above. The venting of the valves 22, 24, and 26 and thereby the air chambers 12, 14, and 16 greatly reduces the rebound of the pneumatic crash cushion 10.

The pneumatic crash cushion 10 is designed so that it is easily restored to a useful condition after being impacted by a colliding vehicle. To this end, after the collision, the valve seats 32 are moved back to their original position as are the inertial diaphragms 30 as shown in FIG. 1. Because the valve seat 32 does not receive any shearing force there should be no destruction to the valve seat upon the application of the axial impact force. Moreover, the walls 20 of the air cushion 10 are pleated so that the pneumatic cushion 10 may compress, often with no structural damage.

The pleated walls 20 of the crash cushion 10 are preferably made from a rotationally molded vinyl material. This material is preferably then wrapped in a nylon material to give it a sufficient tensile strength. The diaphragm attachment ring 28 is preferably a welded steel flange. The inertial diaphragm 30 is preferably made from plywood coated with fiberglass or steel tubing. The valves 22, 24, and 26 are also preferably made from plywood coated with fiberglass. The valve seat 32 is preferably made of a reinforced rubber material.

The crash cushion 10, and specifically the pleated walls 20, are in this embodiment able to withstand an internal air pressure of at least 40 pounds per square inch. This is a sufficient internal pressure to stop a heavy car travelling at 60 miles per hour.

In use, the pneumatic crash cushion 10 may be secured directly to the stationary object 11. When so used, an end member 29 is preferably secured to the stationary object 11. Purely by way of example, each air chamber 12, 14, and 16 is in this embodiment three feet in diameter and two crash cushions (not shown) are situated in a side-by-side relationship.

Figure 6:
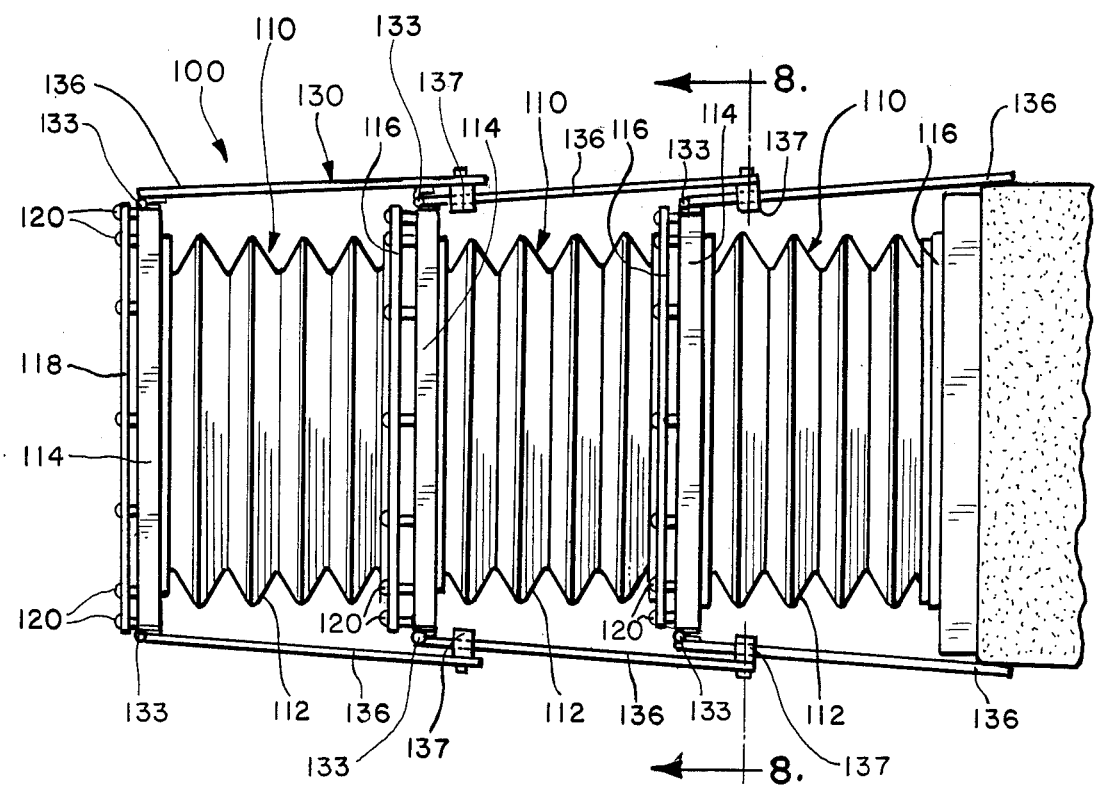
FIG. 6 is a top view of an impact attenuation device which incorporates a second preferred embodiment.
Figure 7:
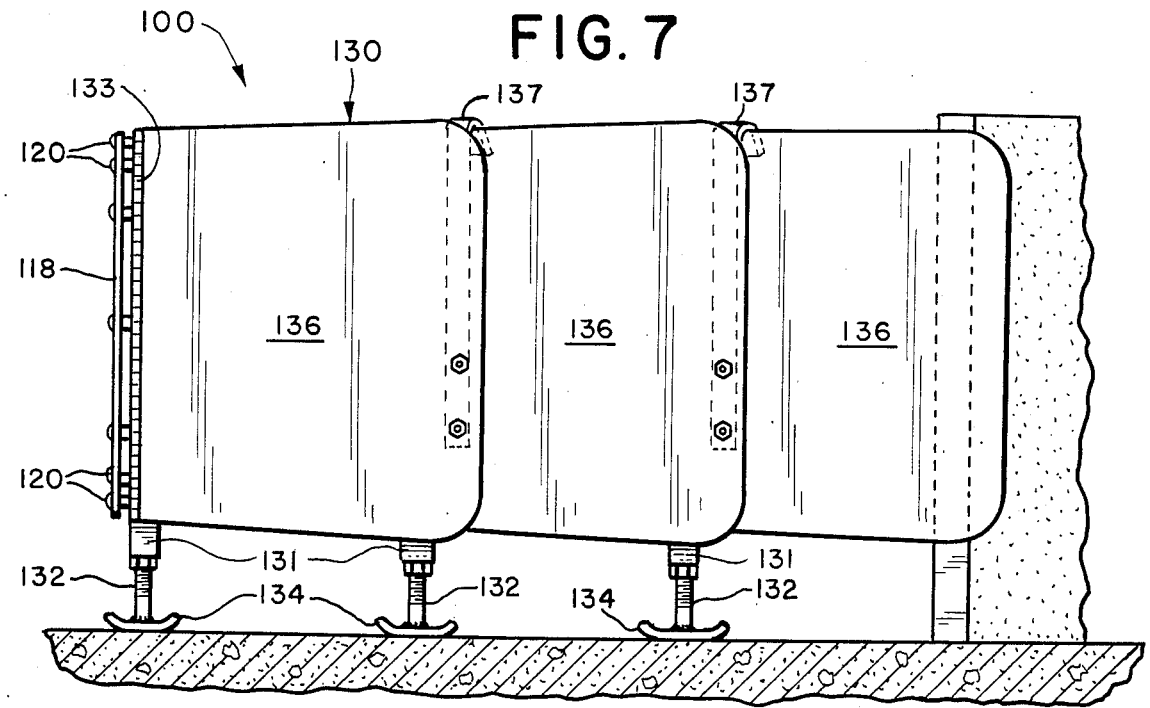
FIG. 7 is a side view of the embodiment of FIG. 6.
Figure 8:
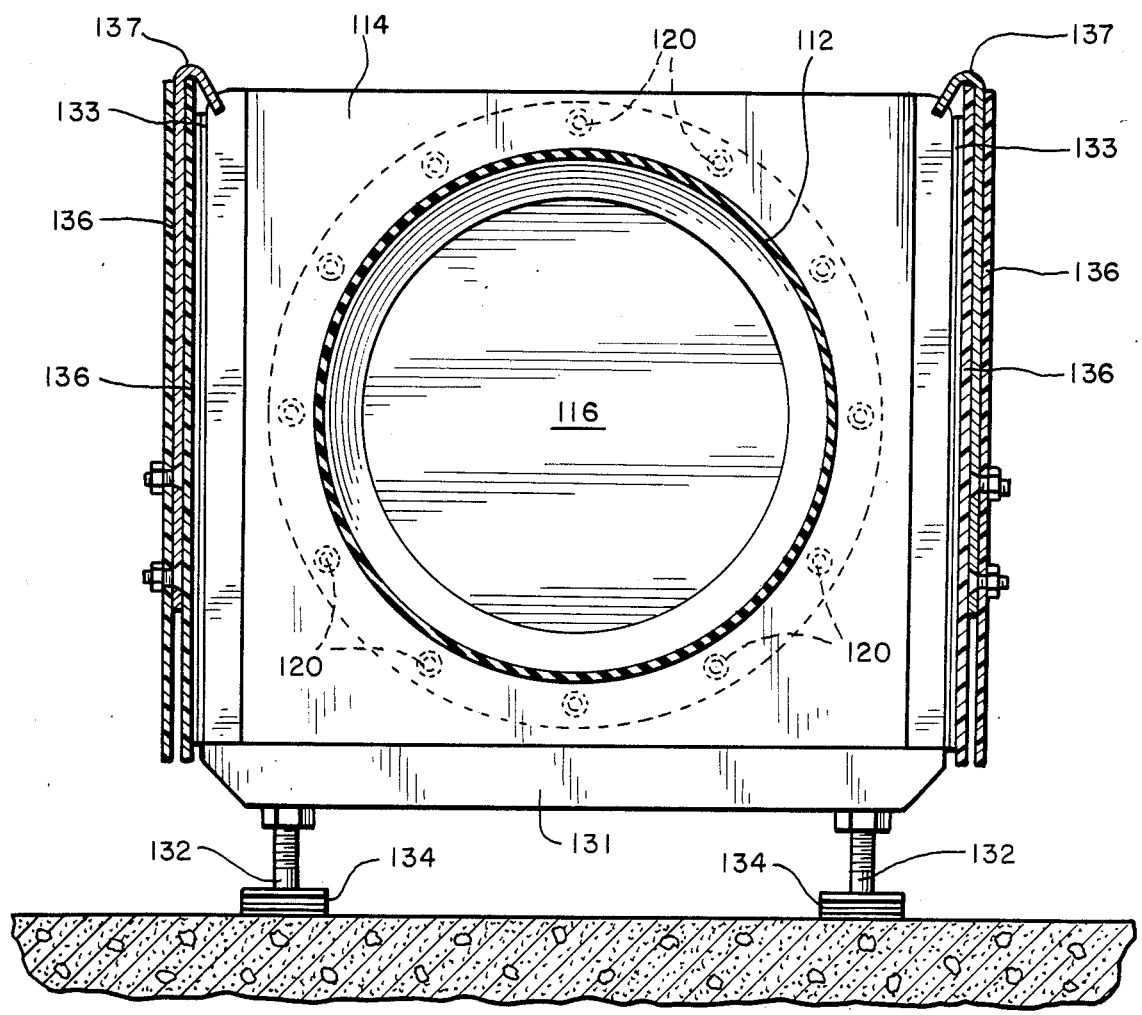
FIG. 8 is a sectional view taken along line 8—8 of FIG. 6.

FIGS. 6–7 relate to a second preferred embodiment 100 of this invention, in which a plurality of pneumatic cells 110 are positioned within a collapsible framework 130.

Each of the cells 110 includes a bellowed wall 112 which is mounted at its forward end to an annular valve seat 114 and at its rearward end to a solid plate 116. Each of the valve seats 114 defines a circular sealing surface which extends around the perimeter of the respective wall 112. In all but the rearwardmost cell 110, the plate 116 serves as a valve plate in cooperation with the valve seat 114 of the adjacent cell 110. A forward valve plate 118 is mounted in front of the forwardmost valve seat 114.

Each of the plates 116, 118 is guided by respective fasteners 120 to slide axially between an open position, in which the adjacent cell 110 to the rear is vented to atmosphere via the circumferential opening between the plate 116, 118 and the associated valve seat 114, and a closed position, in which the adjacent cell 110 to the rear is sealed.

The collapsible framework 130 is secured to the valve seats 114 and includes a series of open frames 131. A pair of spaced legs 132 extend from the lower side of each of the frames 131, and each leg 132 terminates at its lower end in a sliding shoe 134 adapted to slide along a support surface. In addition, a fender panel 136 is mounted to each side of each of the frames 131.

These fender panels 136 are preferably hinged to the frames 131 by hinges 133 and are provided with sliding guides 137 which hold each fender panel 136 against the adjacent fender panel 136. In addition, cables of the type shown in U.S. Pat. No. 4,452,431, assigned to the assignee of the present invention, are preferably provided to guide the collapse of the framework 130. The cells 110 are secured to the framework 130 by the valve seats 114, each of which is secured to a respective one of the frames 131.

The embodiment 100 functions similarly to the embodiment 10 of FIGS. 1–5a. In particular, the cells 110 seal in response to an axial impact to ensure that air in the cells 110 is compressed as the framework 130 collapses, thereby retarding the impacting vehicle. After the cells 110 have reached the point of maximum compression, the plates 116, 118 lift off of the respective valve seats 114, thereby venting the cells 110 and preventing rebound. The cells 110 are sealed and vented sequentially during the impact as described above, and the cells 110 can be fabricated of the materials described above. If necessary, springs can be used to preload the valve plates 116 against the respective valve seats 114, as for example where a smaller cell is placed in front of a larger cell.

It has been found that the operation of the cells 110 is actually enhanced by friction in the framework 130 and friction between the shoes 134 and the support surface. Such friction retards movement of the valve seats 114, and friction between adjacent fender panels 136 and between the sliding guides 137 and the fender panels 136 during collapse of the framework 130 can also contribute to the desired retarding of the valve seats 114. This friction reduces the tendency of the valve seats 114 to chatter against the plates 116, 118 during collapse of the framework 130, and thereby improves the seal between the valve seats 114 and the plates 116, 118. In this way, the efficiency of operation is enhanced.

The cells 110 can also readily be adapted for use in impact attenuation devices such as those shown in U.S. Pat. Nos. 3,944,187 and 3,982,734. Such an adaptation is similar to that of FIGS. 6–7 in that friction between the sliding shoes and the support surface and friction in the sliding guides between adjacent fender panels retard movement of the valve seats, thereby reducing the tendency of the valve plates to chatter against the valve seats during collapse of the impact attenuation device.

In alternate embodiments, it may be preferable to include other sources of friction to retard movement of the valve seats, such as air resistance and cable resistance for example.

It should be understood that various changes and modifications to the preferred embodiments described herein will be apparent to those skilled in the art. For example, the cells 110 can be designed as self-contained modular units which can readily be replaced when needed. It is therefore intended that the foregoing detailed description be regarded as illustrative rather than limiting, and that it be understood that it is the following claims, including all equivalents, which are intended to define the scope of this invention.

I claim:

1. An energy absorbing apparatus comprising:
at least one air chamber for partially compressing upon the application of an axial impact force, the air chamber comprising valve means for substantially sealing the air chamber upon the application of the axial force to trap air within the air chamber throughout the compressive stroke of the air chamber, and for automatically releasing a portion of the air within the air chamber after the air chamber has reached the end of its compressive stroke to reduce rebound.

2. The apparatus of claim 1 wherein the valve means comprises a pressure activated valve and a valve seat configured to seal against the valve.

3. The apparatus of claim 2 further comprising means for frictionally retarding movement of the valve seat to reduce chatter between the valve and the valve seat.

4. The apparatus of claim 1 wherein the air chamber comprises a bellowed wall.

5. A reusable energy absorbing apparatus comprising:
a plurality of air chambers for partially compressing upon the application of an axial impact force;
each of the air chambers comprising valve means for substantially sealing the air chamber throughout the compressive stroke of the air chamber upon the application of the axial impact force to trap air within the air chamber, and for then automatically releasing a portion of the air within the air chamber after the air chamber has reached the end of its compressive stroke to reduce rebound.

6. The apparatus of claim 5 wherein each of the valve means comprises a respective pressure actuated valve and a respective valve seat configured to seal against the valve.

7. The apparatus of claim 6 wherein at least some of the pressure actuated valves are responsive to differential pressure between adjacent air chambers.

8. The apparatus of claim 6 further comprising means for frictionally retarding movement of the valve seats.

9. The apparatus of claim 6 wherein each of the air chambers comprises a respective bellowed wall.

10. The apparatus of claim 9 wherein the bellowed walls are constructed from vinyl wrapped in nylon.

11. The apparatus of claim 9 wherein the bellowed walls are constructed to withstand a sufficient internal pressure to prevent an automobile traveling at highway speeds from impacting a stationary object.

12. An energy absorbing apparatus for preventing a vehicle from impacting a stationary object comprising:

a first air chamber, a second air chamber and at least one additional air chamber, each constructed to compress at least partially upon the application of an axial impact force;

the first air chamber being located farthest from the stationary object and including means for sealing air within the first air chamber upon the application of the axial impact force and for venting a portion of the air from the first air chamber after the energy absorbing apparatus has reached the end of its compressive stroke;

the second air chamber including means for sealing air within the second air chamber after the first chamber has been sealed and for venting a portion of the air from the second air chamber after the first air chamber has begun to vent air; and each of the additional air chambers including means for sealing air within the respective air chamber after the first and second air chambers have been sealed and for venting air from the respective additional air chambers after the first air chamber has begun to vent air.

13. The apparatus of claim 12 wherein each of the means for sealing and venting comprises a respective pressure activated valve and a respective valve seat configured to seal against the valve.

14. The apparatus of claim 13 further comprising means for frictionally retarding movement of the valve seat to reduce chatter between the valve and the valve seat.

15. The apparatus of claim 13 wherein each of the air chambers comprises a respective bellowed wall.

16. The apparatus of claim 15 wherein the bellowed walls are constructed from vinyl wrapped in nylon.

17. The apparatus of claim 15 wherein the valves are activated sequentially.

18. The apparatus of claim 16 wherein the bellowed walls have a sufficient tensile strength to withstand an internal pressure of at least 40 pounds per square inch.

19. The apparatus of claim 13 wherein the valve seats and the valves are configured to vent air around a major portion of the periphery of the respective air chambers.

20. An energy absorbing apparatus comprising:
first and second air chamber walls adapted to compress axially in response to an axial impact force, each comprising a respective valve seat extending around at least a portion of a perimeter of the respective chamber;
first and second valve plates;
first and second means for mounting the first and second valve plates for limited axial motion adjacent to the respective valve seat such that each of the valve plates is movable between a sealed position, in which the respective air chamber is substantially sealed, and a vent position, in which the respective air chamber is vented;
said first valve plate exposed to ambient air pressure on one side and to the pressure of the first air chamber on the other side;
said second valve plate exposed to the pressure of the first air chamber on one side and to the pressure of the second air chamber on the other side;
said valve plates, valve seats and first and second means cooperating upon the application of the impact force to the first valve plate to automatically move the valve plates to the sealed positions to trap and compress air within the air chambers, and automatically to move the valve plates to the vent position after the air chambers have reached the end of their compressive stroke to reduce rebound.

21. The apparatus of claim 20 wherein each of the air chambers comprises a respective bellowed wall.

22. The apparatus of claim 20 wherein the second valve plate comprises a portion of the first air chamber.

23. The apparatus of claim 20 further comprising means for frictionally retarding movement of the valve seats to reduce chatter between the valves and the respective valve seats.

24. An energy absorbing apparatus for dissipating kinetic energy of an axial impact, said apparatus comprising:
a plurality of air chambers successively arranged along an axis, said plurality of air chambers comprising first and second adjacent air chambers, wherein the first air chamber is positioned forwardly of the second air chamber with respect to the axial impact, and said air chambers are configured to compress axially in response to the axial impact;
valve means included in the second air chamber and positioned between the first and second air chambers for sealing the second air chamber as the air chambers compress in response to the axial impact and for venting the second air chamber after the energy absorbing apparatus has reached the end of its compressive stroke to reduce rebound, said valve means responsive to a net axial force which varies as a function of the air pressure of the first and second air chambers such that the valve means is biased to a sealing position when the net force is oriented in the direction of the axial impact and the valve means is biased to a venting position when the net force is oriented opposite to the direction of the axial impact.

25. The apparatus of claim 24 wherein the air chambers are constructed to withstand a sufficient internal pressure to prevent an automobile traveling at highway speeds from impacting a stationary object.

26. An energy absorbing apparatus for dissipating kinetic energy of an axial impact, said apparatus comprising:
an air chamber configured to compress axially in response to the axial impact;
valve means included in the air chamber for sealing the air chamber as the air chamber compresses in response to the axial impact and for venting the air chamber after the energy absorbing apparatus has reached the end of its compressive stroke to reduce rebound, said valve means responsive to a net axial force which varies as a function of the air pressure of the air chamber and forces applied to the valve means by the axial impact such that the valve means is biased to a sealing position when the net force is oriented in the direction of the axial impact and the valve means is biased to a venting position when the net force is oriented in a direction opposite the axial impact.

27. The apparatus of claim 26 wherein the air chamber is constructed to withstand a sufficient internal pressure to prevent rupture of the air chamber when the axial impact is an automobile traveling at highway speeds.

28. The apparatus of claim 1 wherein the valve means releases a portion of the air within the air chamber to atmosphere after the air chamber has reached the end of its compressive stroke.

29. The apparatus of claim 5 wherein each of the valve means releases a portion of the air within the respective air chamber to atmosphere after the air chamber has reached the end of its compressive stroke.

30. The apparatus of claim 12 wherein each of the venting means vents to atmosphere.

31. The apparatus of claim 20 wherein the valve plates vent the respective air chambers to atmosphere when in the vent position.

32. The apparatus of claim 24 wherein the valve means vent the respective air chambers to atmosphere.

33. The apparatus of claim 26 wherein the valve means vents the air chamber to atmosphere.

* * * * *